United States Patent
Martin et al.

(10) Patent No.: US 9,114,353 B2
(45) Date of Patent: Aug. 25, 2015

(54) DEHUMIDIFIER AND BREATHER CONFIGURED FOR OPERATION DURING REGENERATION

(71) Applicant: WAUKESHA ELECTRIC SYSTEMS, INC., Waukesha, WI (US)

(72) Inventors: Arthur Martin, Rowlett, TX (US); John Pruente, Keller, TX (US)

(73) Assignee: Waukesha Electric Systems, Inc., Waukesha, WI (US)

( * ) Notice: Subject to any disclaimer, the term of this patent is extended or adjusted under 35 U.S.C. 154(b) by 98 days.

(21) Appl. No.: 13/718,428

(22) Filed: Dec. 18, 2012

(65) Prior Publication Data

US 2014/0165828 A1 Jun. 19, 2014

(51) Int. Cl.
*B01D 53/02* (2006.01)
*B01D 53/26* (2006.01)
*B01D 53/04* (2006.01)

(52) U.S. Cl.
CPC .......... *B01D 53/261* (2013.01); *B01D 53/0415* (2013.01)

(58) Field of Classification Search
CPC .............................. B01D 53/261; B01D 53/265
See application file for complete search history.

(56) References Cited

U.S. PATENT DOCUMENTS

| | | | |
|---|---|---|---|
| 4,546,442 A | 10/1985 | Tinker | |
| 5,662,727 A * | 9/1997 | Castle et al. | 96/115 |
| RE42,058 E | 1/2011 | Golner et al. | |
| 8,282,832 B2 | 10/2012 | Cropp | |
| 2003/0089238 A1 | 5/2003 | Viereck et al. | |
| 2006/0162304 A1 | 7/2006 | Eichert et al. | |

FOREIGN PATENT DOCUMENTS

| | | |
|---|---|---|
| CA | 2732541 A1 | 8/2012 |
| WO | 2012143285 A1 | 10/2012 |

OTHER PUBLICATIONS

Notification of Transmittal of the International Search Report and the Written Opinion of the International Searching Authority; International Search Report mailed Apr. 10, 2014.
Terrell, EJ et al. Green Tribology. Wind Turbine Tribology. Springer-Verlag Berlin Heidelberg, Jan. 1, 2012 [online], [retrieved on Mar. 14, 2014]. Retrieved from the internet <URL: http:/scholar.google.com/citations?view_op=view_citation&hl=en&user=x_2s6LYaaaaJ&citation_for_view=x_2s6LYAAAAJ:YsMSGLbcyi4C> <DOI: 10.1007/978-3-642-23681-5_18>; pp. 485,522.

* cited by examiner

*Primary Examiner* — Christopher P Jones
(74) *Attorney, Agent, or Firm* — Baker & Hostetler LLP

(57) ABSTRACT

A dehydrator for dehydrating air supplied to a power related or mechanical device includes a first container configured to hold a desiccant, a first heater arranged with the first container configured to heat the desiccant in the first container, a second container configured to hold a desiccant, and a second heater arranged with the second container configured to heat the desiccant in the second container. The dehydrator further includes a conduit configured to selectively connect one of the first container and the second container to the power related or mechanical device and a controller configured to selectively operate one of the first heater and the second heater.

18 Claims, 8 Drawing Sheets

DEHUMIDIFIER AND BREATHER CONFIGURED FOR OPERATION DURING REGENERATION

FIELD OF THE INVENTION

This invention pertains generally to dehydrators that may be operated during regeneration. More particularly, the invention pertains generally to dehydrators for removing moisture from air input to power related or mechanical devices that may be operated continuously during regeneration.

BACKGROUND OF THE INVENTION

Power related or mechanical devices, such as large electrical transformers, load tap changers, turbine gearboxes, circuit breakers, hydraulic fluid reservoirs, mechanical devices and/or gearboxes which require a dry blanket to, among other reasons, prevent moisture contamination of lubricant, and the like, typically include components immersed in oil, which is utilized to insulate, lubricate, cool and/or the like the components associated with the power related or mechanical devices. Because the oil expands and contracts with temperature changes, such power related or mechanical devices are provided with a head space above the oil that is vented to the atmosphere to control the pressure within, for example, an oil tank.

More specifically, as the tank increases in temperature, the oil in the tank expands, the pressure in the tank increases, and a portion of the air in the headspace is forced from the tank. When the tank begins to cool, the oil in the tank contracts, the pressure in the tank decreases, and air is drawn into the tank to equalize the pressure in the tank.

A dehydrator breather is conventionally utilized to regulate and condition the air flowing into and out of the tank. In some dehydrating breathers, a vent is provided between the tank and the outside air. A valve is positioned between the vent and the dehydrator breather that by opening and closing, as necessary, controls air flow into and out of the tank.

Often, the dehydrator includes a desiccant material, such as a silica gel, to remove any moisture from the air before it is allowed into the tank. Moisture entering the tank can be detrimental and has the capability of destroying the properties of the oil, damaging parts of the power related or mechanical device, or the like. Problems arise, however, when the desiccant is near capacity, at capacity, or is no longer able to absorb moisture. To address this issue, prior art devices have included a heater associated with the desiccant to encourage drying of the desiccant. This results in formation of condensation on the walls of the dehydrator breather. When the condensation returns to a liquid state, it flows out of the dehydrator via at least one drain. However, in order to operate the heater, the dehydrator has to be disconnected from the tank by operation of the previously mentioned valve, operated when the tank air is flowing out of the tank, and/or operated when air is not flowing at all. This can be difficult to determine, requires a complex control circuitry to operate, and still typically results in non-continuous and less than optimal operation.

Accordingly, it would be desirable to provide a dehydrator breather that can operate substantially continuously even during regeneration.

SUMMARY OF THE INVENTION

The foregoing needs are met, to a great extent, by the invention, wherein in one aspect a technique and apparatus are provided for a regenerating dehydrator configured for continuous operation.

In accordance with one embodiment, a dehydrator for dehydrating air supplied to a power related or mechanical device includes a first container configured to hold a desiccant, a first heater arranged with the first container configured to heat the desiccant in the first container, a second container configured to hold a desiccant, a second heater arranged with the second container configured to heat the desiccant in the second container, an air inlet configured to guide air to at least one of the first container and the second container, a drain configured to allow moisture to drain from at least one of the first container and the second container, a port configured to connect to a power related or mechanical device and provide dehydrated air to the power related or mechanical device and receive air from the power related or mechanical device, a conduit configured to selectively connect the port to one of the first container and the second container, and a controller configured to selectively operate one of the first heater and the second heater. A further embodiment includes a wind turbine with a gearbox and the dehydrator described above.

In accordance with another embodiment, a dehydrator for dehydrating air supplied to a power related or mechanical device includes a first containing means for holding a desiccant, a first heating means for heating the desiccant in the first containing means, a second containing means for holding a desiccant, a second heating means for heating the desiccant in the second containing means, an air receiving means for guiding air to at least one of the first containing means and the second containing means, a drain means for allowing moisture to drain from at least one of the first containing means and the second containing means, a device connecting means for connecting to a power related or mechanical device and providing dehydrated air to the power related or mechanical device and receiving air from the power related or mechanical device, a connecting means for connecting the power related or mechanical device to one of the first containing means and the second containing means, and a controlling means for operating one of the first heating means and the second means. A further embodiment includes a wind turbine with a gearbox and the dehydrator described above.

In accordance with yet another embodiment, a process of regenerating a dehydrator that supplies dehydrated air to a power related or mechanical device includes holding a desiccant in a first container, holding a desiccant in a second container, connecting a power related or mechanical device and providing dehydrated air to the power related or mechanical device from the first container, heating the desiccant in the second container while the power related or mechanical device is connected to the first container, connecting the power related or mechanical device and providing dehydrated air to the power related or mechanical device from the second container, and heating the desiccant in the first container while the power related or mechanical device is connected to the second container.

In accordance with yet another embodiment, the device is either a mechanical or electrical device that includes a heater to heat a drain during a regeneration process. The regeneration process driving moisture out of a desiccant material contained therein. The heater preventing freezing of the moisture in a drain of the device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
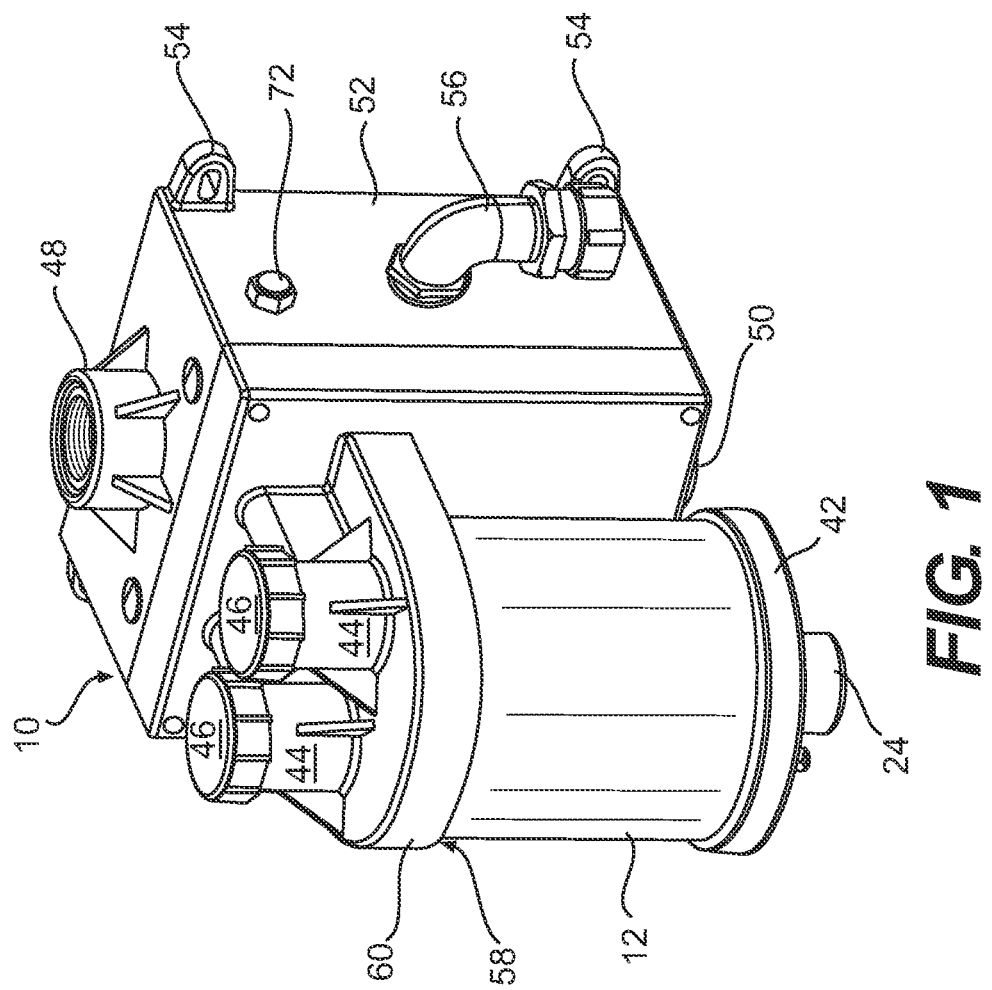
FIG. 1 shows a perspective view of a regenerating dehydrator constructed in accordance with invention.

The invention will now be described with reference to the drawing figures, in which like reference numerals refer to like parts throughout. Embodiments of the invention advantageously provide a regenerating dehydrator that can operate during regeneration.

Figure 2:
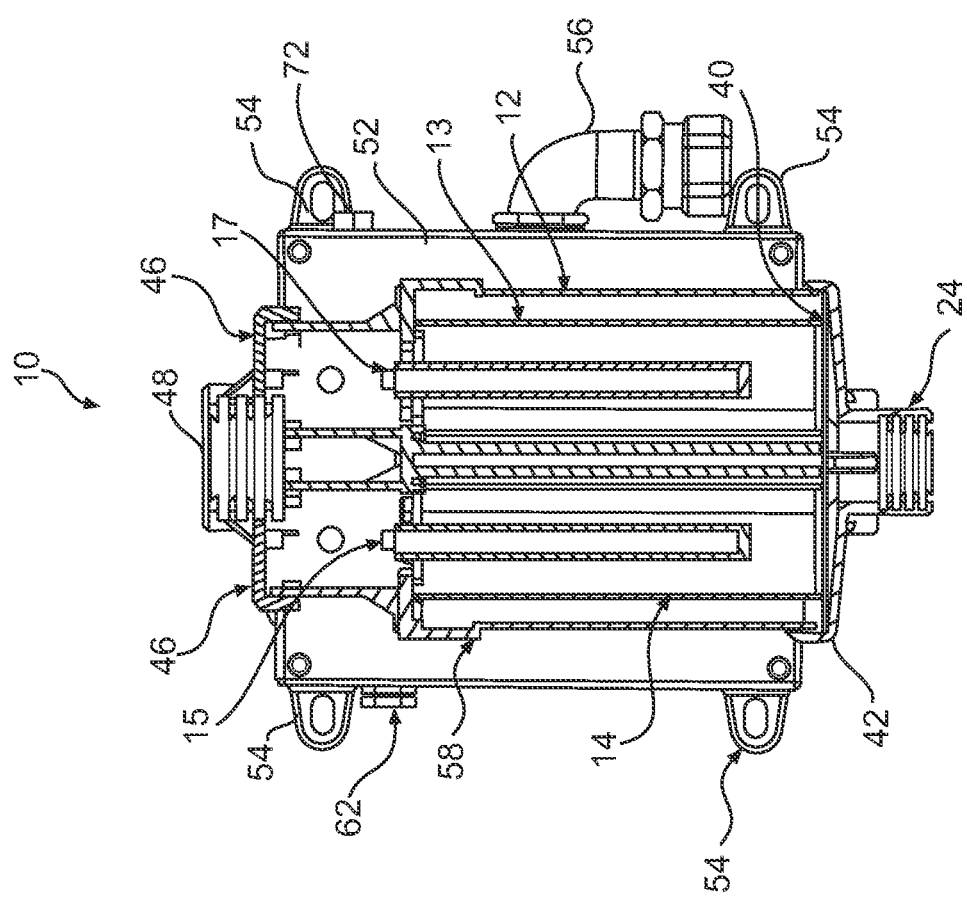
FIG. 2 shows a cross-section of the regenerating dehydrator of FIG. 1.
Figure 3:
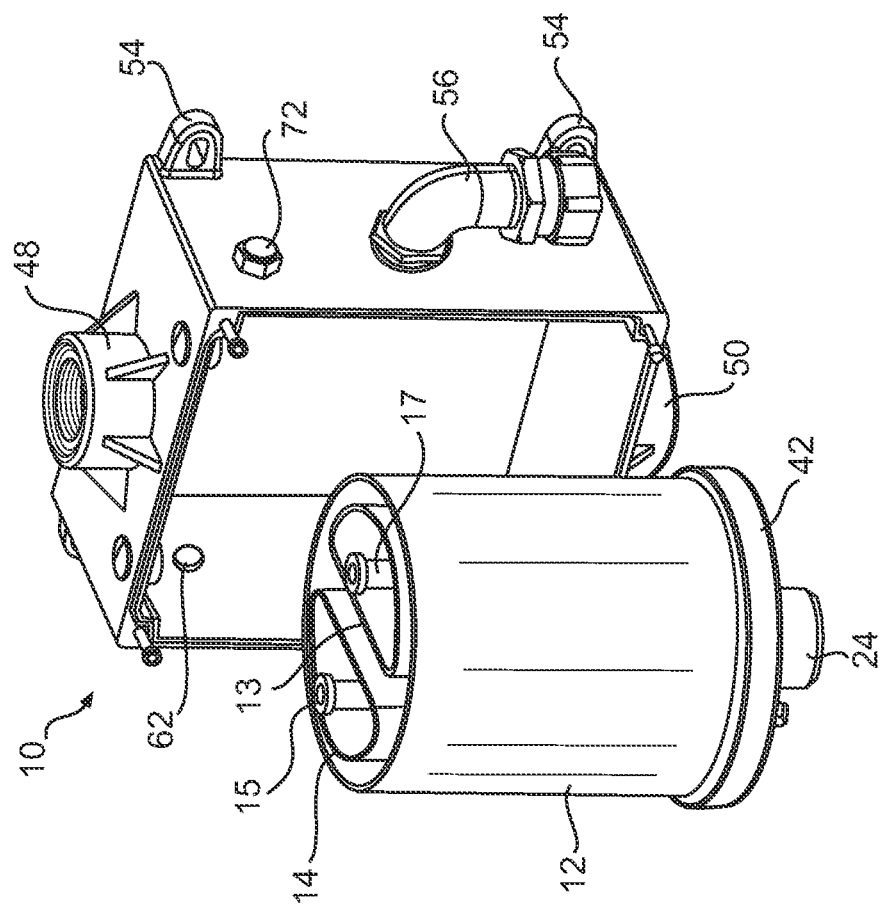
FIG. 3 shows a partial exploded view of the regenerating dehydrator of FIG. 1.
Figure 4:
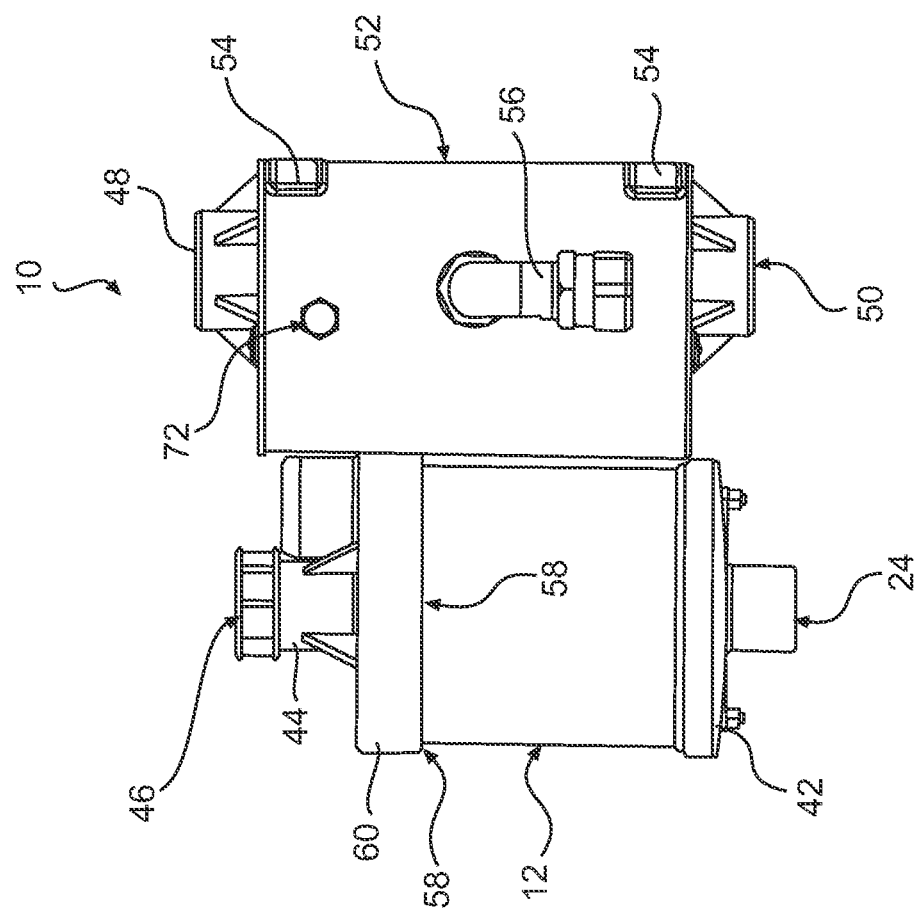
FIG. 4 shows a side view of the regenerating dehydrator of FIG. 1.

FIG. 1 shows a perspective view of a regenerating dehydrator constructed in accordance with invention; FIG. 2 shows a cross-section of the regenerating dehydrator of FIG. 1; FIG. 3 shows a partial exploded view of the regenerating dehydrator of FIG. 1; and FIG. 4 shows a side view of the regenerating dehydrator of FIG. 1. Referring now to FIGS. 1-4 there is shown a dehydrator 10 in accordance with the invention. As shown in FIG. 1, the dehydrator 10 includes a vessel 12 that, in an exemplary aspect of the invention, may be formed of glass or a transparent plastic material, such as polycarbonate. Other materials are contemplated and are within the scope of the invention. In an exemplary aspect of the invention, as shown in FIG. 1, the vessel 12 may have a substantially cylindrical shape. Other shapes are contemplated by the invention as well.

As shown in FIGS. 2 and 3, a container 13 and a container 14 may be mounted within the interior of the vessel 12 and may be utilized to each contain desiccant. A heater 15 may be positioned within the container 14 and a heater 17 may be positioned within the container 13. The heaters 15, 17 are utilized to increase the temperature of the desiccant contained in the container 13 and the container 14 to drive moisture from the desiccant contained in each. Other arrangements and configurations of the heaters 15, 17 are contemplated and are within the scope of the invention.

The heaters 15, 17 may be any a type of thermal devices, including, but not limited to, a resistive heater, a positive temperature coefficient (PTC) heater capable of maintaining a self-regulated operation, and the like.

In an exemplary embodiment of the invention, the container 14 and the container 13 may include, at least partially, a screen material providing openings in the containers 13, 14. The openings allow air to flow into the containers 13, 14 and be exposed to the desiccant therein before flowing into the power related or mechanical device. However, the screen material may be sized to retain the desiccant therein. In the same or another exemplary aspect of the invention, the desiccant may be coated with an indicating substance that causes the color of the desiccant to change according to the amount of moisture that the desiccant is retaining. The openings in the containers 13, 14 may allow the desiccant to be viewed from outside of the containers 13, 14, and thus, allow the condition of the desiccant to be ascertained. The openings in the containers 13, 14 may also allow moisture to escape the desiccant container.

Coupled to the bottom of the vessel 12 is a communal drain 24. As moisture is released from the containers 13, 14 during the heating process or otherwise, the moisture may collect on the internal walls of the vessel 12 or elsewhere within vessel 12. Thereafter, the moisture may condensate and travel to the bottom of the vessel 12 via gravity and exit the dehydrator 10 through the communal drain 24. Arranged below the containers 13, 14 may be an internal fiber filter paper 40 so as to prevent contaminants from entering the vessel 12 or to prevent desiccant in the containers 13, 14 from escaping the vessel 12. The vessel 12 may further include a lower housing 42 which may include the communal drain 24.

The communal drain 24 of the dehydrator 10 may further be in thermal communication with one or both of the heaters 15, 17 as disclosed in U.S. patent application Ser. No. 13/608, 245, filed on Sep. 10, 2012, entitled Cold-Weather Recharging Dehydrating Breather, which is incorporated by reference herein in its entirety. In such a configuration, the heaters 15, 17 may heat the communal drain 24 and limit freezing of moisture draining from the communal drain 24 of the dehydrator 10.

The dehydrator 10 may further include fill ports 44 arranged above the containers 13, 14. Arranged on the fill ports 44 may be caps 46. The caps 46 may be threaded and may cooperate with threads that may be arranged on the fill ports 44. The caps 46 may be removed so that maintenance personnel can add additional desiccant to the containers 13, 14 through fill ports 44, inspect the containers 13, 14, or the like.

The dehydrator 10 may connect to and transfer air to power related or mechanical devices through an upper mounting port 48 or a lower mounting port 50. If one of the mounting ports 48, 50 is not used, the opening may be plugged with a plug having threads thereon that may cooperate with threads that may be arranged inside the upper mounting port 48 or the lower mounting port 50.

The mounting ports 48, 50 may be arranged in a control cabinet 52. The control cabinet 52 may provide a conduit from the vessel 12 to the power related or mechanical device. Additionally, the control cabinet 52 may include the control circuitry necessary for controlling operation of the dehydrator 10. The control cabinet 52 may further include mounting flanges 54 in order to mount the dehydrator 10 in association with the power related or mechanical device. The control cabinet 52 may further include a power and data conduit 56 that provides access for power lines, data lines, and the like to enter and exit the control cabinet 52.

Figure 8:
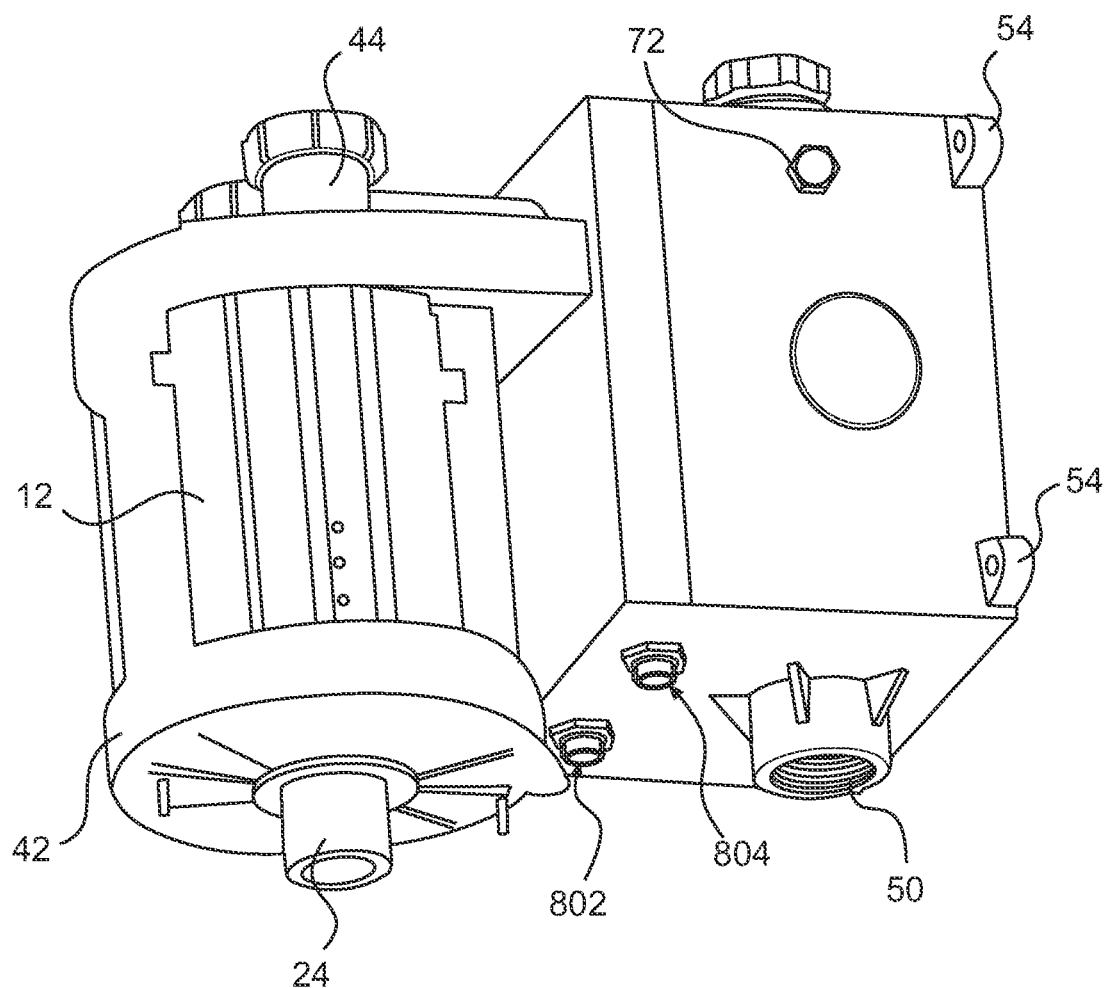
FIG. 8 shows a perspective view of another aspect of a regenerating dehydrator showing details of power and data cable connectors constructed in accordance with invention.

FIG. 8 shows a perspective view of another aspect of a regenerating dehydrator showing details of power and data cable connectors constructed in accordance with invention. In particular, FIG. 8 shows an aspect of the dehydrator 10 having a power connector 802 and a data connector 804. The power connector 802 and the data connector 804 may be twist lock type connectors to connect power and data lines to the dehydrator 10.

The control cabinet 52 may further include an exhale filter vent 72 that is configured to direct air from the tank 27 of the power related or mechanical device to the atmosphere bypassing the vessel 12. The control cabinet 52 may further include a control cabinet moisture vent 62 that allows the control cabinet 52 to be vented to the atmosphere as necessary. The dehydrator 10 may further include an air inlet 58 arranged between the vessel 12 and a top 60 of the vessel 12. The air inlet 58 allows air to be received into the dehydrator 10, be exposed to the desiccant held in the containers 13, 14 before flowing into the power related or mechanical device via upper mounting port 48 or lower mounting port 50. The air inlet 58 may provide a 360° opening between the top 60 of the vessel 12. The air inlet 58 may utilize other configurations.

Accordingly, for example, when the oil 29 expands within the tank 27 of the power related or mechanical device, air in a head space is forced from the tank 27 and into the control cabinet 52. Thereafter, the air may flow from the control cabinet 52 out the exhale filter vent 72. Accordingly, the air pressure in the tank 27 is greater than the air pressure in the vessel 12 is subsequently equalized.

When the atmospheric air pressure is greater than the air pressure inside the tank 27, the air can be provided to the head space through the air inlet 58 and into the vessel 12. Thereafter, the air may be exposed to desiccant in either container 13 or container 14 and then may flow into the tank 27 to equalize pressure. When there is no pressure differential between, for example, the tank 27 and the atmosphere, there will be no airflow.

Figure 5:
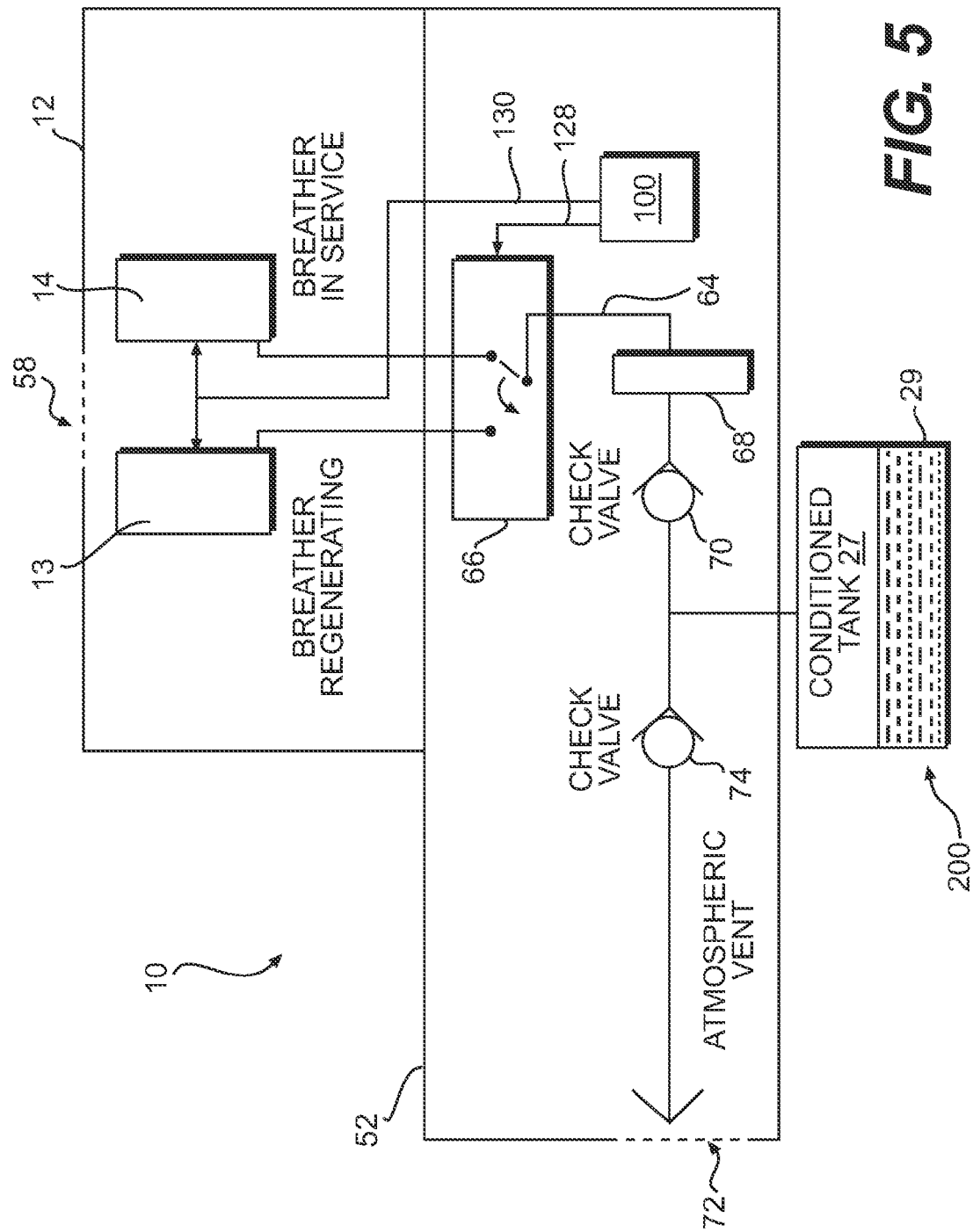
FIG. 5 shows a schematic of the regenerating dehydrator constructed in accordance with the invention with a power related or mechanical device.

FIG. 5 shows a schematic of the regenerating dehydrator constructed in accordance with the invention with a power related or mechanical device. In particular, FIG. 5 shows a particular arrangement of the dehydrator 10 and shows the vessel 12, control cabinet 52, and the containers 13, 14. FIG. 5 further shows a solenoid valve 66 that connects either the container 13 or the container 14 to a conduit 64. As shown in FIG. 5, the container 14 is currently connected through the solenoid valve 66 to the conduit 64. On the other hand, the container 13 is not connected to conduit 64. Accordingly, air can enter the vessel 12 through the air inlet 58 and pass through the container 14 and through the solenoid valve 66. Thereafter the air will flow through conduit 64 and may pass through a filter 68. The filter 68 may be a 0.1 micron replaceable filter and may include a filter holder. No filter and other filter arrangements are contemplated as well. Thereafter, the air may flow past a check valve 70 and into the tank 27 of the power related or mechanical device 200. When air is exiting the tank 27, the check valve 70 may prevent flow of the air through the filter 68, conduit 64, solenoid valve 66, and vessel 12. To the contrary, air flowing from the tank 27 may flow through check valve 74 and exit the dehydrator 10 through the exhale filter vent 72. It should be noted that the FIGS. 1-5 show two containers 13, 14 holding the second. It is additionally contemplated that more than two containers may be arranged in the dehydrator 10 and such multiple container aspects are within the scope of the invention.

Figure 6:
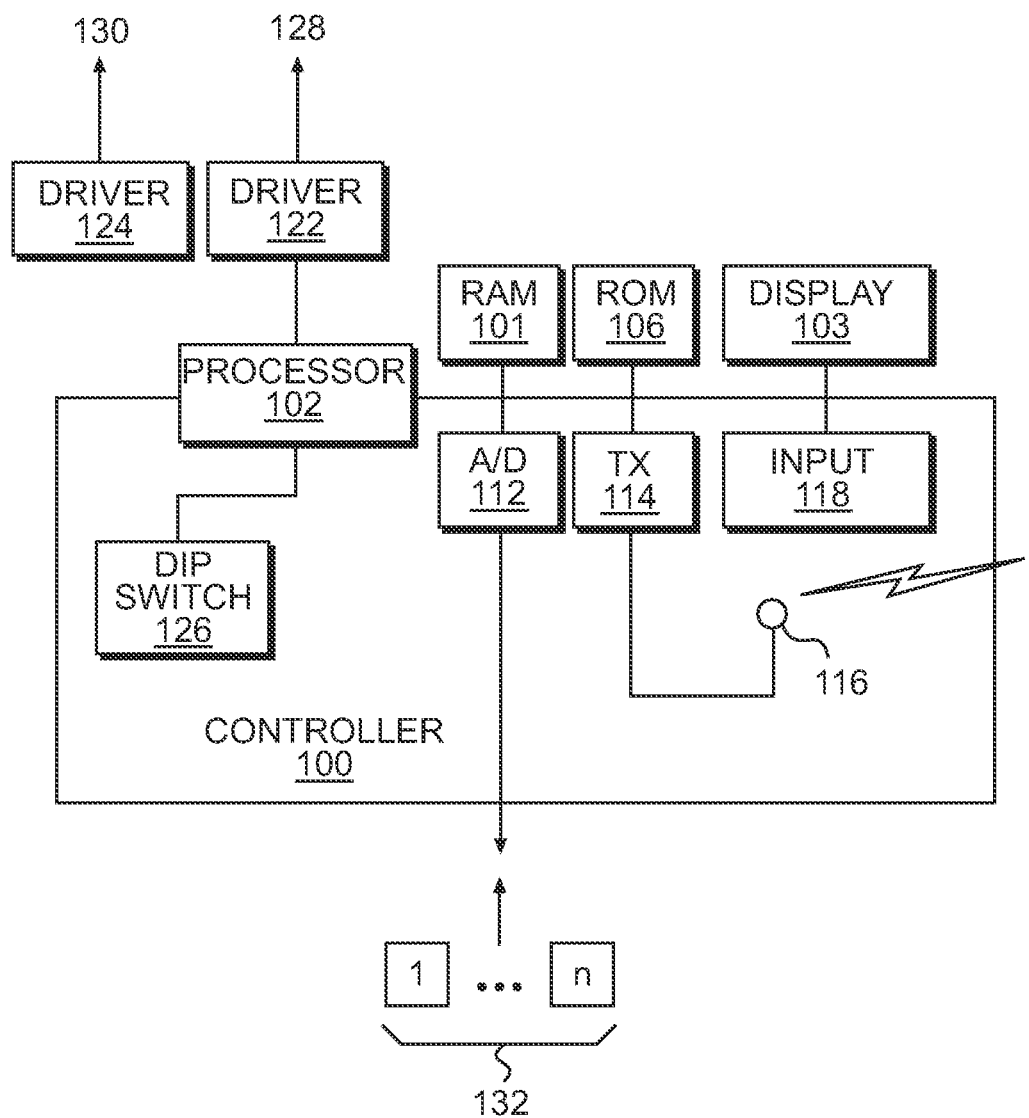
FIG. 6 shows a schematic of the controller constructed in accordance with the invention with a power related or mechanical device.

FIG. 6 shows a schematic of the controller constructed in accordance with the invention with a power related or mechanical device. Operation of the solenoid valve 66 may be controlled by a controller 100. In particular, the controller 100 may use any type of timing control to switch the solenoid valve 66 to connect container 13 to the conduit 64 or connect the container 14 to the conduit 64. In particular, controller 100 may include a timer that operates the solenoid valve 66 to connect one of the containers 13, 14 to the conduit 64; and actuate a respective one of the heaters 15, 17 in the other one of the containers 13, 14.

In a particular aspect, the controller 100 may include a processor 102 executing an application to operate the solenoid valve 66 and further executing an application to actuate the heaters 15, 17. The controller 100 may include a driver 122 to provide an actuation signal 128 to the solenoid valve 66 and accordingly actuate the solenoid valve 66. The controller 100 may further include a heater driver 124 that provides an actuation signal 130 to each of the heaters 15, 17 or a relay associated with the heaters 15, 17 to selectively actuate each of the heaters 15, 17. Controller 100 may further include a random-access memory 104 to store data, the application used in conjunction with the invention, and the like. Controller 100 may further include a read-only memory 106 to store various firmware and the like for the controller 100.

Additionally, the controller 100 may include a display 108. The display 108 may be one or more of a LED display, LCD display, LED lights, status lights or the like to provide various outputs for the user or maintenance personnel. In one particular aspect, the display 108 may include LEDs that indicate power is being received by the dehydrator 10 and/or the controller 100, the status of the dehydrator 10, the status of the controller 100, and/or the like. The controller 100 may further include an input device 118. The input device 118 may be a key pad, keyboard, USB input, FireWire and/or the like. The input device 118 may allow a user or maintenance personnel to interact with the controller 100. The input device 118 and the display 108 may be configured together as a touchscreen.

The controller 100 may further include a transmitter 114 with associated antenna 116. The transmitter 114 may be used to connect to a wireless fidelity protocol communication channel, a cellular communication channel, or the like. The transmitter 114 may be configured to receive software updates, receive status request, and the like from users. The transmitter 114 may further transmit problems, status, maintenance issues, and/or the like. The controller 100 may further include one or more analog-to-digital converter(s) 112. The analog-to-digital converter 112 may receive various sensor inputs from sensors 132 (sensors 1-n). The analog-to-digital converter 112 may convert analog sensor inputs to a digital signal so that it may be forwarded to the processor 102. The sensors 132 may include a humidity sensor for sensing an ambient humidity, a humidity sensor sensing the humidity in the headspace of the tank 27, or a humidity sensor sensing the humidity within the dehydrator 10. The sensors may include temperature sensors that sense the temperature of the tank 27, the temperature of the dehydrator 10, or the ambient temperature. The sensors may further include pressure sensors that sense the pressure in the tank 27, pressure within the dehydrator 10, or ambient pressure.

The sensors may include a current sensor to sense a current to the heaters 15, 17. This sensor may monitor the correct operation of the heaters 15, 17. The controller 100 may include a process such that when a column regenerates and the current sensor does not detect a current flowing to the heater 15, 17 for that column, then the controller 100 may generate an alarm that may be sent to a remote monitoring facility.

The sensors may include a sensor to detect pressure in the dehydrator 10 or air flow through the dehydrator 10 to determine if the dehydrator 10 becomes plugged. The controller 100 may include a process such that when it is determined that the dehydrator 10 is plugged, the controller 100 may generate an alarm that may be sent to a remote monitoring facility.

The controller 100 may further include other input type devices including, for example, dip switch inputs 126. Other input types are contemplated as well and form part of the scope of the invention. In this regard, a user or maintenance personnel can set dip switches of the dip switch inputs 126 to set the various functional actions for use by the controller 100. For example, the dip switch may set how often the solenoid valve 66 is actuated, the dip switches may set how long the heaters 15, 17 are actuated, how long the heater actuation may be delayed, and/or the like. For example, a first dip switch may indicate a seven-day frequency of solenoid switching and heater actuation, a second dip switch may indicate a 14 day frequency of solenoid switching heater actuation, and the like.

Figure 7:
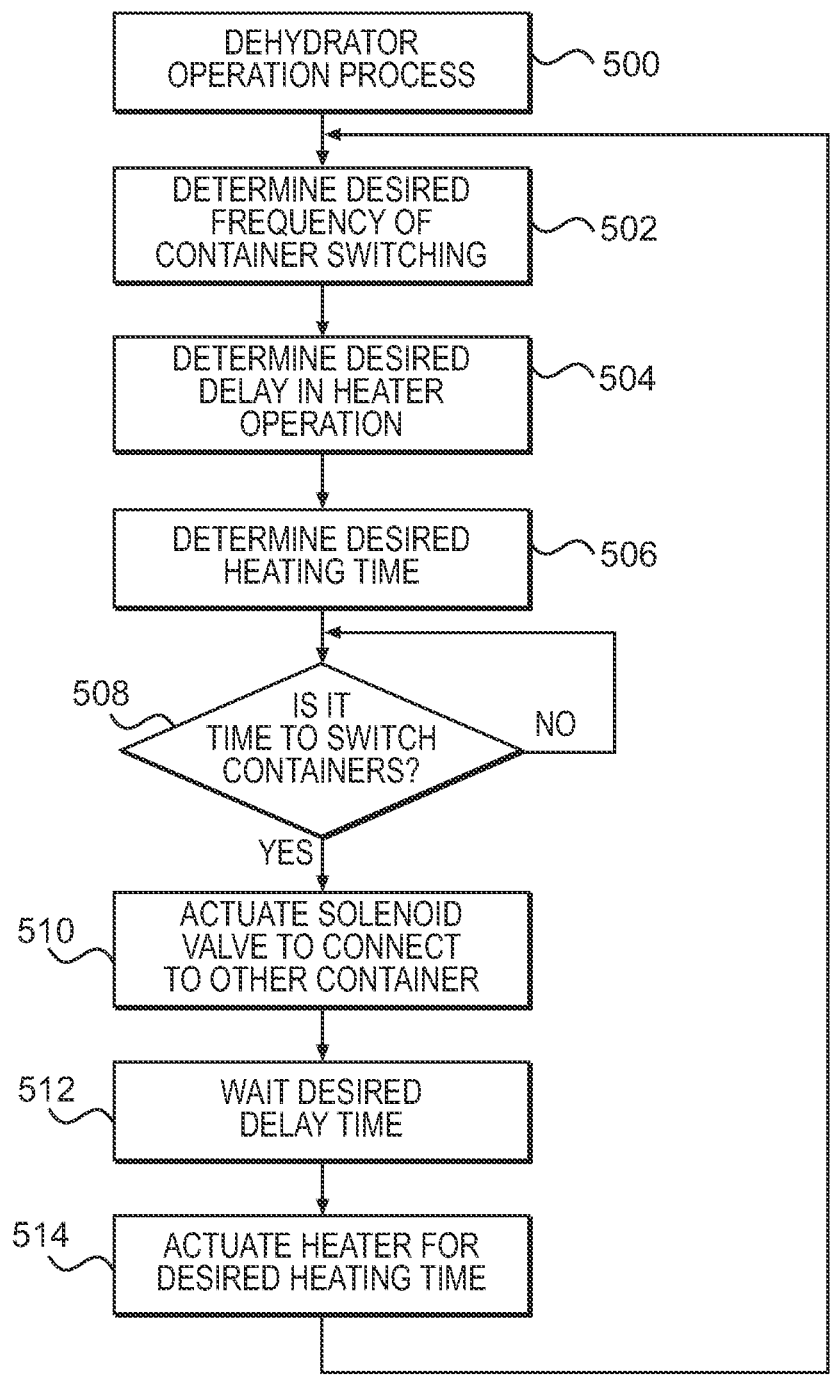
FIG. 7 shows a process of operating the regenerating dehydrator according to the invention.

FIG. 7 shows a process of operating the regenerating dehydrator according to the invention. In particular, FIG. 7 shows a dehydrator operation process 500 that may be implemented using the dehydrator 10 or a similar type of dehydrator in conjunction with a controller such as controller 100 and or the like.

In 502, the process 500 determines the desired frequency of container switching. More specifically, how often the solenoid valve 66 should switch between container 13 and container 14. In this regard, the frequency of container switching in 502 may be based on a preset value, based on a stored value in RAM 104, based on dip switch inputs 126 configuration, or the like.

Thereafter in 504, the process 500 determines a desired delay in heater operation. In this regard, actuation of one of the heaters 15, 17 may be delayed by a certain amount of time prior to the next time the solenoid valve 66 is actuated. This delay helps to ensure that the particular container 13, 14 does not absorb moisture while being idle. In this regard, the heating delay may be based on a preset value, based on a stored value in RAM 104, based on dip switch configuration 126, or the like. In one example, the frequency of switching the solenoid valve is every 7 days, and the delay for the heater may be 6 days to ensure that the particular container 13, 14 was recently regenerated.

In process 506, the process 500 may determine a desired heating time. In this regard, the heating time may be based on a preset value, based on a stored value in RAM 104, based on dip switch configuration 126, or the like.

Next, in process 508 it is determined whether or not it is time to switch containers. Based on the frequency of the container switching value determined in process 502, a timer may be set and when the time has expired, the process will forward to process 510. If the timer has not expired, the process 508 will loop until time expires.

Thereafter, in process 510 the solenoid valve 66 may be actuated to disconnect the currently connected container 13, 14 and connect to other container 13, 14. In this regard, the previously connected container 13, 14 may be at a point where it needs to be regenerated. In process 510, that container 13, 14 may be disconnected for purposes of regeneration. The other container 13, 14 has recently been regenerated and is ready for use and connection to the tank 27.

The container 13, 14 that is disconnected may be immediately regenerated by actuation of a respective heater 15, 17. However, in conjunction with process 512, actuation of a respective heater 15, 17 may wait a desired delay time. This delay time ensuring that the particular container 13, 14 may receive regeneration closer to the time in which it will be implemented in conjunction with the next process 510.

In process 514, the respective heater 15, 17 may be actuated for a desired heating time. In this regard, the heating time may be based on a preset value, based on a stored value in RAM 104, based on dip switch configuration 126, or the like.

Accordingly, the dehydrator 10 of the invention provides multiple containers 13, 14, each with its own heater 15, 17. The dehydrator 10 in conjunction with the controller 100 and process 500 may utilize one of the containers 13, 14 at a given time. The other container 13, 14 may be regenerated using a respective heater 15, 17 so that when the dehydrator 10 switches to the other container 13, 14 via solenoid valve 66, the dehydrator 10 may utilize a newly regenerated container 13, 14. In this regard, the power related or mechanical device may be continuously provided with dehydrated air through the dehydrator 10. There is little or no downtime.

This, for example, provides power related or mechanical devices with a continuous supply of dehydrated air which ensures lower maintenance of the power related or mechanical device, lower maintenance of the oil used therewith, and/or the like. The dehydrator 10 is especially useful with various power related or mechanical devices including wind turbines. In particular, wind turbines include a gearbox having oil contained therein. The dehydrator 10 provides the wind turbine gearbox with a substantially continuous source of dehydrated air to ensure high-performance, lower maintenance costs, and the like.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A dehydrator for dehydrating air supplied to a power related or mechanical device comprising:
   a first container configured to hold a desiccant;
   a first heater arranged with the first container configured to heat the desiccant in the first container;
   a second container configured to hold a desiccant;
   a second heater arranged with the second container configured to heat the desiccant in the second container;
   an air inlet configured to guide air to at least one of the first container and the second container;
   a drain configured to allow moisture to drain from at least one of the first container and the second container;
   a port configured to connect to a power related or mechanical device and provide dehydrated air to the power related or mechanical device and receive air from the power related or mechanical device;
   at least one check valve associated with the port, the at least one check valve configured to allow dehydrated air to flow to the power related or mechanical device, and the at least one check valve configured to prevent a flow of air from the power related or mechanical device;
   at least one other check valve associated with the port, the at least one other check valve configured to allow a flow of air from the power related or mechanical device to an exhaust port;
   a conduit configured to selectively connect the port to one of the first container and the second container; and
   a controller configured to selectively operate one of the first heater and the second heater.

2. The dehydrator of claim 1 further comprising a valve configured to provide the selective connection in association with the conduit to connect the port to one of the first container and the second container.

3. The dehydrator of claim 2 wherein the controller is further configured to actuate the valve to provide the selective connection in association with the conduit to connect the port to one of the first container and the second container.

4. The dehydrator of claim 2 wherein the controller is further configured to actuate the valve to connect the conduit to the first container and further configured to operate the second heater associated with the second container; and the controller is further configured to actuate the valve to connect the conduit to the second container and further configured to operate the first heater associated with the first container.

5. The dehydrator of claim 2 wherein the drain is in thermal communication with at least one of the first heater and the second heater in order to limit freezing of moisture in the drain.

6. The dehydrator of claim 1 wherein the controller further comprises a processor and at least one driver, random-access memory, read-only memory, display, analog-to-digital converter, transceiver, input device, and sensor,
   wherein the transceiver is configured to transmit data related to at least one of the following: a problem with the dehydrator, a status of the dehydrator, or a maintenance issue with the dehydrator.

7. The dehydrator of claim 1 wherein the conduit further comprises at least one sensor to sense at least one of temperature, flow, current, humidity and pressure.

8. The dehydrator of claim 1 further comprising a housing configured to hold the first container and the second container.

9. A wind turbine comprising a gearbox and a dehydrator according to claim 1.

10. A dehydrator for dehydrating air supplied to a power related or mechanical device comprising:
    a first container configured to hold a desiccant;
    a first heater arranged with the first container configured to heat the desiccant in the first container;
    a second container configured to hold a desiccant;
    a second heater arranged with the second container configured to heat the desiccant in the second container;
    an air inlet configured to guide air to at least one of the first container and the second container;
    a drain configured to allow moisture to drain from at least one of the first container and the second container;
    a port configured to connect to a power related or mechanical device and provide dehydrated air to the power related or mechanical device and receive air from the power related or mechanical device;
    at least one check valve associated with the port, the at least one check valve configured to allow dehydrated air to flow to the power related or mechanical device, and the at least one check valve configured to prevent a flow of air from the power related or mechanical device;
    at least one other check valve associated with the port, the at least one other check valve configured to allow a flow of air from the power related or mechanical device to an exhaust port;
    a conduit configured to selectively connect the port to one of the first container and the second container;
    a valve configured to provide the selective connection in association with the conduit to connect the port to one of the first container and the second container; and
    a controller configured to selectively operate one of the first heater and the second heater,
    wherein the controller is further configured to actuate the valve to connect the conduit to the first container after a set amount of time and further configured to operate the second heater associated with the second container after a predetermined delay and for a predetermined amount of time,
    wherein the controller is further configured to actuate the valve to connect the conduit to the second container after the set amount of time and further configured to operate the first heater associated with the first container after the predetermined delay and for the predetermined amount of time, and
    wherein the set amount of time is substantially equal to the sum of the predetermined delay and the predetermined amount of time.

11. The dehydrator of claim 10 wherein the controller is configured to receive and store an input of the set amount time, the predetermined delay, and the predetermined amount of time.

12. A dehydrator for dehydrating air supplied to a power related or mechanical device comprising:
- a first containing means for holding a desiccant;
- a first heating means for heating the desiccant in the first containing means;
- a second containing means for holding a desiccant;
- a second heating means for heating the desiccant in the second containing means;
- an air receiving means for guiding air to at least one of the first containing means and the second containing means;
- a drain means for allowing moisture to drain from at least one of the first containing means and the second containing means;
- a device connecting means for connecting to a power related or mechanical device and providing dehydrated air to the power related or mechanical device and receiving air from the power related or mechanical device;
- an air flow control means for allowing air to flow to the power related or mechanical device, and for preventing air from flowing from the power related or mechanical device;
- at least one other air flow control means associated with the device connecting means, the at least one other air flow control means for preventing air flow from the power related or mechanical device to the dehydrator, and for allowing a flow of air from the power related or mechanical device to an exhaust means;
- a connecting means for connecting the power related or mechanical device to one of the first containing means and the second containing means; and
- a controlling means for operating one of the first heating means and the second means.

13. The dehydrator of claim 12 wherein the connecting means further comprises a valve configured to provide a selective connection to the first containing means and the second containing means.

14. The dehydrator of claim 13 wherein the controlling means actuates the valve to provide the selective connection to one of the first containing means and the second containing means.

15. The dehydrator of claim 13 wherein the controlling means actuates the valve to connect to the first containing means after a set amount time and operates the second heating means associated with the second containing means after a predetermined delay and for a predetermined amount of time; and wherein the controller means actuates the valve to connect to the second containing means after the set amount time and further operates the first heater means associated with the first container means after the predetermined delay and for the predetermined amount of time, wherein the set amount of time is substantially equal to the sum of the predetermined delay and the predetermined amount of time.

16. The dehydrator of claim 15 wherein the controlling means is configured to receive and store an input of the set amount time, the predetermined delay, and the predetermined amount of time.

17. The dehydrator of claim 12 further comprising a housing means for holding the first containing means and the second containing means.

18. A wind turbine comprising a gearbox and a dehydrator according to claim 12.

* * * * *